United States Patent [19]

Werner et al.

[11] Patent Number: 5,000,479
[45] Date of Patent: Mar. 19, 1991

[54] HOUSING FOR A GAS GENERATOR

[75] Inventors: Bernd Werner, Schliersee; Karl-Erik Nilsson, Ottobrunn, both of Fed. Rep. of Germany

[73] Assignee: Bayern-Chemie Gesellschaft fuer Flugchemische Antriebe mbH, Aschau am Inn, Fed. Rep. of Germany

[21] Appl. No.: 410,624

[22] Filed: Sep. 21, 1989

[30] Foreign Application Priority Data

Sep. 21, 1988 [DE] Fed. Rep. of Germany ....... 3832120

[51] Int. Cl.$^5$ .............................................. B60R 21/26
[52] U.S. Cl. ..................................... 280/736; 280/741
[58] Field of Search ............... 280/728, 730, 731, 732, 280/736, 740, 741, 742, 734; 102/530, 531; 222/565

[56] References Cited

U.S. PATENT DOCUMENTS

| 1,779,843 | 10/1930 | Gerstle | 222/565 |
|---|---|---|---|
| 3,882,673 | 5/1975 | Doin et al. | 280/741 |
| 4,116,466 | 9/1978 | Gehrig | 280/741 |
| 4,131,299 | 12/1978 | Ono et al. | |
| 4,578,277 | 3/1986 | Bolieau | 280/741 |
| 4,796,912 | 1/1989 | Lauritzen | 280/742 |

FOREIGN PATENT DOCUMENTS

| 2330194 | 12/1974 | Fed. Rep. of Germany . | |
| 2915202 | 10/1980 | Fed. Rep. of Germany . | |
| 41440 | 2/1989 | Japan | 280/736 |
| 743366 | 1/1956 | United Kingdom | 102/530 |
| 2022194 | 12/1979 | United Kingdom | 280/740 |

OTHER PUBLICATIONS

"Airbag and belt pretensioner provide increased safety for drive and front passenger", ATZ Automobiltechnische Zeitschrift 84 (1982), pp. 77 & 78.

Primary Examiner—Charles A. Marmor
Assistant Examiner—Karin Tyson
Attorney, Agent, or Firm—W. G. Fasse; D. H. Kane, Jr.

[57] ABSTRACT

A housing for a gas generator for inflating a safety bag in a passenger vehicle is constructed of modular units preferably having a tubular or cylindrical tubular configuration. At least one combustion chamber and one filter casing are joined to each other so that the longitudinal axes of the units align with each other longitudinally. An axially facing gas exit from the combustion chamber into the filter casing provides an initially axial gas flow which is then diverted radially outwardly from the filter casing into the safety bag.

9 Claims, 2 Drawing Sheets

HOUSING FOR A GAS GENERATOR

FIELD OF THE INVENTION

The invention relates to a gas generator housing having a combustion chamber and at least one gas filter chamber, especially for inflating a safety bag in a vehicle.

BACKGROUND INFORMATION

An article in "Automobiltechnische Zeitschrift" 84th year, 1982, No. 2, pages 77 and 78 describes an airbag safety system in which a filter surrounds the combustion chamber radially outwardly with the gas generator in the center for installation in a steering wheel of a motor vehicle. Such a structure is substantially limited for use inside the steering wheel to soften impacts between the driver and the steering wheel. Use of this known system for protecting the passenger on the front seat does not seem to be practical.

German Patent Publication No. 2,915,202 (Nilsson et al.) also describes an airbag inflating system with a concentric arrangement of the components relative to each other. Hence, that known system is subject to the same limitations as the one described above. The components of the known gas generator are made primarily of sheet metal.

Tubular gas generators for inflating a safety bag on the passenger side, in which the ignition, the combustion, and the filter casings, which have radially extending gas discharge openings, are arranged in axial alignment with each other along the length of the generator, are known in the prior art. In such generators the large surface chamber walls are exposed to unnecessarily high compressive loads, which must be taken up by thicker walls requiring higher material expenditures. Where the gas distribution is radially directed, unfavorable conditions prevail for a particleseparating by rerouting of the gases. An insertion of expensive filter material becomes necessary along the entire length of the gas generator.

Another unfavorable characteristic of the above mentioned conventional tubular gas generators is that during an alteration in the power rating, that is, when it is necessary to change the amount of propellant, not only the combustion chamber, but all the other components, such as the ignition chamber and filter components, must be altered.

German Patent Publication No. 2,330,194 (Wolf et al.) describes a conventional tubular gas generator for inflating a safety bag in a motor vehicle. The combustion chamber is formed in a tubular gas generator inner housing received in an outer housing. Labyrinth type mufflers are arranged radially or axially relative to the combustion chamber. In both instances the known system takes up substantial space. Further disadvantages are seen in that flange rings and baseplates, which are protected by two outer covers that are screwed into the outer housing, not only exhibit a limited stability or strength, but also an insufficient sealing of the outer housing. For this reason, the combustion chamber was arranged separately within the outer housing, which brings about considerable complications, especially in the assembly of the known structure, and rather large dimensions.

Conventional gas generator systems as described above have the disadvantage, that, especially in the tubular version, they further require two gas generators with two igniters and the accompanying cables and plugs. Said systems also need a double output stage in the impact sensor for activating both igniters. As a result, costs are high and integration into the other vehicle structures is not easy.

OBJECTS OF THE INVENTION

In view of the foregoing it is the aim of the invention to achieve the following objects singly or in combination:

to build a gas generator at a low expense while still assuring a high functional reliability;

to provide a tubular gas generator especially suitable for inflating a safety airbag, particularly on the front seat passenger side of a motor vehicle;

to join at least one filter casing with a combustion chamber in such a way that they are axially aligned, whereby various joining methods may be employed singly or in combination; and to employ standardized tubular housing and combustion chamber sections so that for different power ratings only the combustion chamber volume needs to be increased or decreased while leaving the standardized diameter unchanged for connection to a standardized filter casing or casings.

SUMMARY OF THE INVENTION

A gas generator according to the invention has at least one combustion chamber having a longitudinal axis and at least one filter casing also having a longitudinal axis extending in axial alignment with the longitudinal axis of the combustion chamber. At least one perforated end wall facing axially provides communication between the combustion chamber and the filter casing secured to the combustion chamber. The filter casing has longitudinal slots in its outer wall so that the gas entering the filter axially leaves the filter casing substantially radially for filling a safety bag into which the filter casing reaches. In a preferred embodiment, two filter casings are secured to one combustion chamber located centrally between the two filter casings, each of which communicates with the combustion chamber through a respective perforated combustion chamber end wall.

An essential and advantageous feature of the invention is that the gas generator is made up of several cup-shaped sheet metal components that form a tubular, readily produceable, optimally stable construction set. The components of the gas generator, namely the combustion chamber and the filter casings have standardized diameters so that the same filter casings can be joined to combustion chambers of different length and hence different volume, by form-locking or material-locking methods. The components are pot- or kettle-shaped. A cylindrical configuration is preferred, but not critical. The combustion chamber has a cup-shaped radially extending ignition member attached to the gas generating combustion chamber, preferably centrally thereof. The combustion chamber is preferably divided into two sections to facilitate the assembly of a fuel pack.

Further advantageous features of the invention are seen in that compression exposed surface areas are kept as small as possible and that the axial alignment of the combustion chamber and filter casing or casings provides a favorable gas flow path, a good structural strength, low weight, and a relatively small size compared to conventional generators of this type and of equal capacity. In addition, the present modular construction provides a system with good production conditions well adapted to assembly line requirements. The primarily axial gas flow distribution efficiently uses the expensive filter material throughout the length of the filter casing, so that savings are achieved by requiring less filter material.

A material locking connection, such as by welding, brazing, or soldering, of the pot-shaped components achieves optimal seals, and thereby, also the best conditions for the safe accommodation of the chemical fuel components and for a long-lasting operation reliability.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
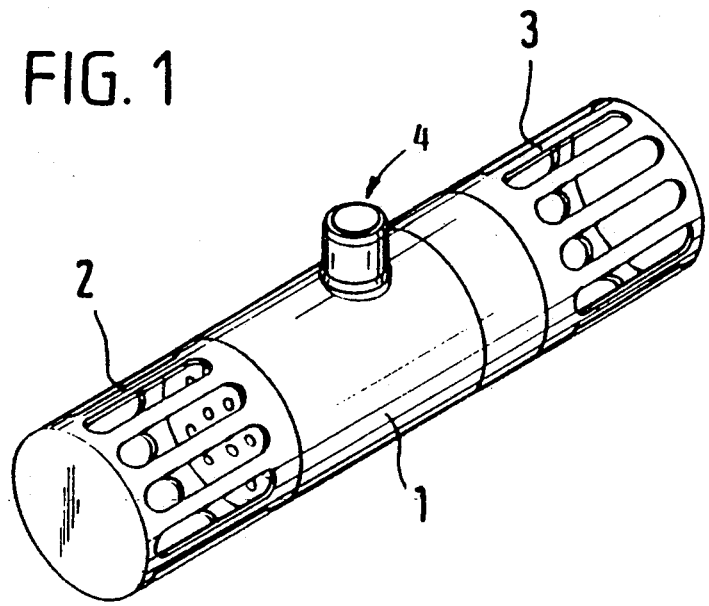
FIG. 1 shows a perspective view of a gas generator according to the invention in its fully assembled state, however, without filter material inserted into the filter casings.

As shown in FIG. 1, the gas generator comprises a gas production or combustion chamber 1 and at least one, preferably two, filter casings 2 and 3. These main components are made of sheet metal and joined together to form a substantially tubular cylindrical unit.

Figure 2:
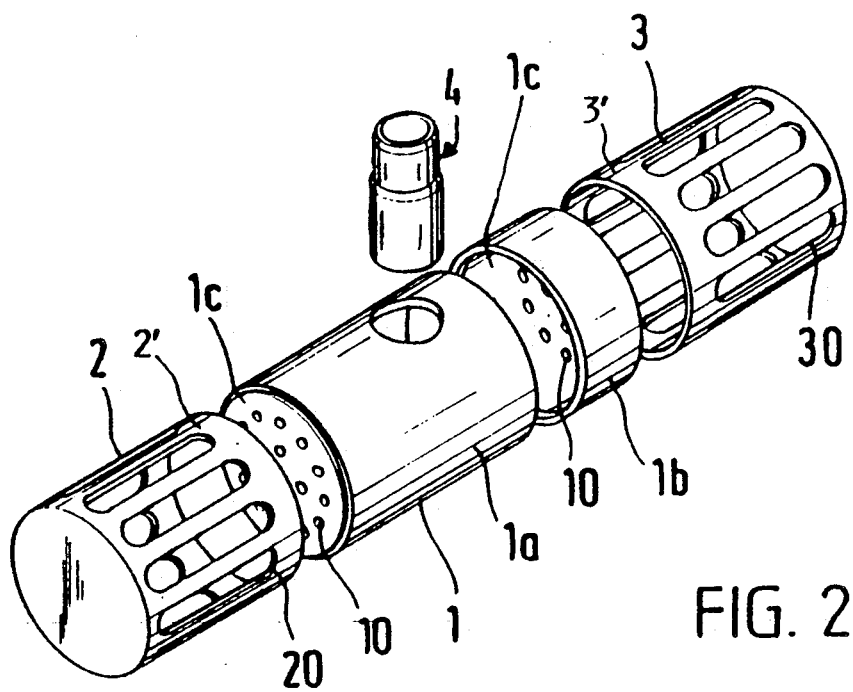
FIG. 2 is an exploded view of the gas generator of FIG. 1 before assembly of the components.

The components 1, 2, and 3 are modular units of the gas generator shown disassembled in FIG. 2. Conventional filter inserts or cartridges are now shown in FIGS. 1 and 2. The main components 1, 2, 3 are constructed according to sheet metal construction methods, whereby relatively thin sheet metal may be used as is known as such from German Patent Publication No. 2,915,202. The fuel for the present gas generator and the ignition means are also conventional and hence not described in detail herein.

The gas production or combustion chamber 1 contains the combustible fuel for the gas generation and an igniter or igniting mechanism 4 for the electrical firing of a primer capsule for igniting the fuel spontaneously in response to an external signal produced particularly by a sensor in response to a crash, in order to inflate the protective safety bag or bags.

In the symmetrical arrangement shown in FIGS. 1 and 2, the gas production chamber 1 forms the central component to which the two filter casings 2 and 3 are secured. The chamber 1 is made up of two sections 1a and 1b, that are unequal in axial length. These unequal lengths have several advantages. First, it facilitates the manufacture and especially the welding of the combustion chamber sections. Second, it facilitates the insertion of the fuel. The filter casings 2 and 3 are connected to the central gas production chamber 1 so that the filter casings 2 and 3 are arranged axially to the longitudinal axis of the gas production chamber 1. The gas production or combustion chamber 1 contains a pyrotechnical fuel set for producing pressurized gas, when the igniter 4 is activated. The igniter 4 is secured centrally to the chamber 1 at essentially 0° or at a 90° angle to the longitudinal axis so that it extends axially or radially, whereby any cable leading to the igniter does not interfere with any safety bag or bags arranged to receive the produced gas through axial, longitudinal slots 20 and 30 in the casings 2 and 3. The produced pressurized gas flows through jet nozzles 10 in end walls 1c of the chamber 1 into the filter casings 2 and 3. The gas is thereby made turbulent and guided through the filter cartridge in the periphery of the filter casings 2, 3.

According to the invention, the main components 1, 2, and 3 formed as cups are joined to form a cylindrical unit, whereby the junctions are located in the area of the circular surfaces around the end walls 1c of the combustion chamber 1, whereby these end walls 1c with their circular surfaces form the interfaces between the combustion chamber 1 and the filter casings 2 and 3. The connections may be surface connections, line connections or many points may form the connection, either peripherally or distributed over the circular surfaces, depending on the joining process, the joining means, and the materials to be joined.

In the cylindrical unit of the invention, the combustion chamber 1 forming the central module and the filter casings 2, 3 have a common longitudinal central axis. The end walls or disks 1c which may be either flat or ball-shaped, have such a number of jet nozzles 10 as is required for rapidly inflating the safety bag. The size, number, and distribution of the jet nozzles 10 will be determined also with regard to the desired gas flow and distribution through the filter. The combustion chamber sections 1a and 1b are assembled after the fuel has been inserted. Similarly, the filter casings 2, 3 are only secured to the chamber after the filter cartridge has been inserted.

The filter casings 2 and 3 are then symmetrically joined to the gas production combustion chamber 1. Said casings 2 and 3 are arranged symmetrically relative to the central axis of the igniter 4 extending radially to the central longitudinal axis of the cylindrical unit. Said igniter 4 is centrally located within the joined gas production chamber 1. The igniter 4 is tightly joined in a sealed manner to the sheet metal housing of the combustion chamber 1. The igniter or ignition mechanism 4 contains a pyrotechnic charge, which is preferably electrically or mechanically initiated. The pressure production or combustion chamber 1 has the larger wall thickness compared to the sheet metal thickness of the casings 2 and 3 since the chamber 1 is exposed to a considerably higher compressive load.

The components 1, 2, and 3 of the gas generator are made of metal, preferably sheet metal of the same or similar material, especially such as are joinable.

The following are especially suitable joining procedures: electron beam welding, laser beam welding, abrasive welding, shrinking, and metal gluing; or adhesive bonding using adhesives of the type available in air and space craft, since the same or similar light metal sheet materials are employed. Other joining procedures, such as flanging or riveting or the use of roller beading or threaded connections can be employed singly or in combination.

It is essential that corrosion-resistant materials are used, due to the long time environmental influences. It is also important that the wall thicknesses are dimensioned to withstand the compression loads. It is further required that the junctions between the components 1, 2, and 3 provide an absolute seal against the atmosphere so as to keep the fuel from deteriorating over time. For the same reasons the connection of the ignition cup or housing 4 to the combustion chamber 1 must also provide satisfactory seals.

Figure 3:
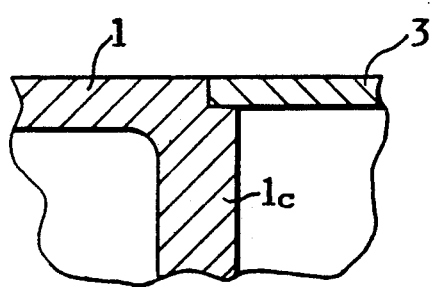
FIG. 3 shows a connection of the components of the gas generator welded or joined to each other by an electron beam or laser beam welding.
Figure 7:
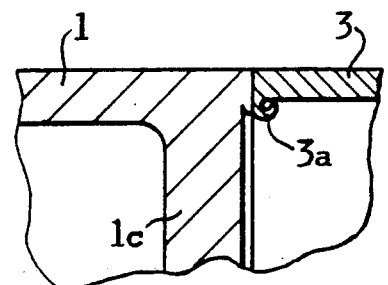
FIG. 7 is a joint connection formed by friction welding on one side only of a combustion chamber end wall.
Figure 4:
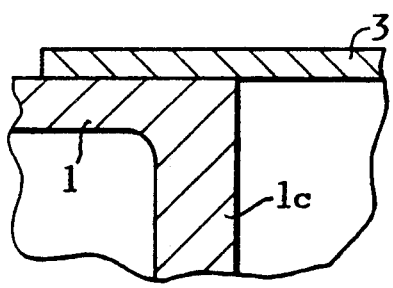
FIG. 4 is a joint connection formed by welding, shrinking, gluing, or adhesively bonding.
Figure 8:
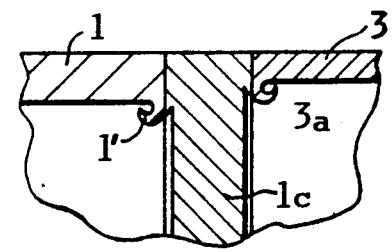
FIG. 8 is a joint connection formed by friction welding on both sides of a combustion chamber end wall.
Figure 5:
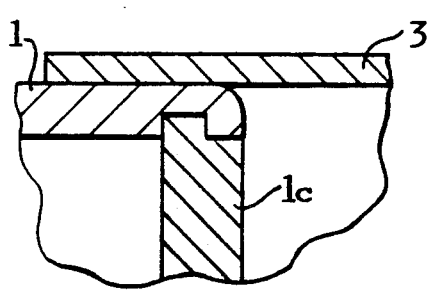
FIG. 5 is a joint connection formed by flanging or upsetting, or shrinking, or gluing.
Figure 9:
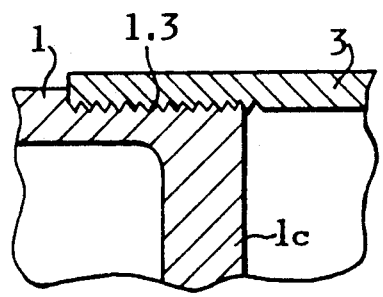
FIG. 9 shows a joint formed by a self-locking threaded connection.
Figure 6:
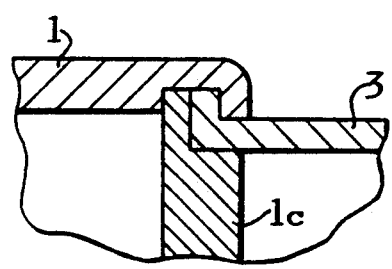
FIG. 6 shows a joint connection formed by flanging or rolling.
Figure 10:
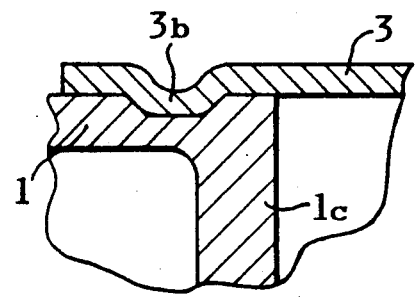
FIG. 10 is a joint connection formed by lock-beading using a rolling bonding process.

FIGS. 3 to 10 show different securing means for attaching the components of the gas generator housing to each other in sheet metal compatible ways. FIG. 3 shows a joint suitable for electron beam or laser beam welding. FIG. 4 shows a joint suitable for welding, including spot welding, shrinking, gluing, or adhesively bonding. FIG. 5 shows a joint suitable to be formed by flanging, upsetting, or shrinking. FIG. 6 shows a joint suitable to be formed by flanging or rolling. FIGS. 7 and 8 show joints formed by friction welding. FIG. 7 shows one friction weld 3a between the filter casing 3 and the perforated bottom 1c of the combustion chamber 1. FIG. 8 shows a friction weld 1' between the chamber 1 and the bottom 1c in addition to the friction weld 3a. FIG. 9 shows a threaded connection 1.3. The threading may be self-locking for security reasons. FIG. 10 shows a roller beaded connection 3b. Tubular, preferably cylindrical tubular housings, result from these joining techniques. Such tubular housings are quite suitable for installation in, on, or below a vehicle dashboard. The invention is not restricted to cylindrical cross-sections of housings.

The illustrated connections or joints and similar sheet metal compatible joints may be used singly or in combination including for securing the combustion chamber sections 1a and 1b to each other.

Although the invention has been described with reference to specific example embodiments, it will be appreciated, that it is intended to cover all modifications and equivalents within the scope of the appended claims.

What we claim is:

1. A housing for a gas generator for inflating a safety bag in a passenger vehicle, comprising at least three, cup-shaped tubular enclosure components having substantially the same cross-sections and including two first cup-shaped components each having a tubular jacket and one closure end wall integral with said tubular jacket for forming together a combustion chamber having a longitudinal central axis, gas exit means in at least one of said closure end walls facing axially, and at least one second cup-shaped component forming a filter casing also having a longitudinal axis coinciding with said central axis of said combustion chamber, first means for securing said two first cup-shaped components to each other to form said combustion chamber with a tight seal, further means for securing said second cup-shaped component forming said filter casing to said one end of said combustion chamber where said gas exit means are located to form said housing, so that generated gas can enter into said filter casing in an axial direction through said gas exit means, and gas discharge openings in a peripheral wall of said filter casing for discharging gas into said safety bag substantially in a radial direction of said filter casing, said at least three cup-shaped components forming a modular tubular construction in which the volume of said combustion chamber can be changed by providing one of said first two cup-shaped components as units having different lengths.

2. The gas generator housing of claim 1, wherein at least said first means for securing provide an undetachable connection between said two first cup-shaped components forming said combustion chamber.

3. The gas generator housing of claim 1, wherein said combustion chamber and said filter casing have a circular cross-section to form a cylindrical tubular housing construction.

4. The gas generator housing of claim 1, wherein said gas exit means comprise nozzle openings in said at least one closure end wall.

5. The gas generator housing of claim 4, wherein a number, cross-sectional flow area, and a distribution of said nozzle openings in said at least one closure end wall are selected to influence a gas flow pattern into said filter casing.

6. The gas generator housing of claim 1, further comprising ignition means for igniting a fuel in said combustion chamber, said ignition means comprising an igniter housing attached to said combustion chamber to extend radially and substantially centrally into said combustion chamber.

7. The gas generator housing of claim 1, wherein said two first cup-shaped components forming said combustion chamber have a wall thickness which is larger than a wall thickness of said second cup-shaped component forming said filter casing.

8. The gas generator housing of claim 1, wherein said two first cup-shaped components and said second cup-shaped component are made of sheet metals which are compatible with each other for forming effective joints by said first and further means for securing.

9. The gas generator housing of claim 1, wherein said first and second means for securing comprise any one of the following material compatible securing means: electron beam welding, laser beam welding, friction welding, shrinking, metal adhesive bonding, flanging, rolling, roller bonding, roller beading, and upsetting.

* * * * *